United States Patent [19]

Malavasi

[11] 3,906,191

[45] Sept. 16, 1975

[54] ELECTROMECHANICAL DEVICE FOR CHECKING THE VALIDITY OF PERFORATED CARDS

[75] Inventor: Claude Malavasi, Annecy, France

[73] Assignees: Daniel Lejonc; Paul Monge, France

[22] Filed: June 4, 1973

[21] Appl. No.: 366,493

[30] Foreign Application Priority Data
June 2, 1972 France .................. 72.19963
May 29, 1973 France .................. 73.19554

[52] U.S. Cl. 235/61.11 C; 235/61.7 B; 340/149 A; 200/46 R
[51] Int. Cl. G06k 7/04; G06k 5/04; G06k 19/06
[58] Field of Search 235/61.12 N, 61.12 M, 61.12 R, 235/61.12 C, 61.11 C, 61.11 E, 61.11 B, 61.7 B, 61.7 R, 61.6 E, 61.6 J; 340/149 A; 200/46 R; 40/2.2; 177/314; 346/17

[56] References Cited
UNITED STATES PATENTS

| | | | |
|---|---|---|---|
| 2,964,374 | 12/1960 | Miller | 346/17 |
| 3,255,339 | 6/1966 | Rausing | 235/61.7 B |
| 3,448,249 | 6/1969 | Jones | 235/61.11 R |
| 3,515,339 | 6/1970 | McEwan | 235/61.7 R |
| 3,534,397 | 10/1970 | McWade | 235/61.11 C |
| 3,610,889 | 10/1971 | Goldman | 235/61.7 B |
| 3,617,706 | 11/1971 | Oberhart | 235/61.7 B |
| 3,665,161 | 5/1972 | Oberhart | 235/61.7 B |
| 3,697,729 | 10/1972 | Edwards | 235/61.7 B |

Primary Examiner—Daryl W. Cook
Assistant Examiner—Robert M. Kilgore
Attorney, Agent, or Firm—Larson, Taylor and Hinds

[57] ABSTRACT

The invention includes a mechanical-electrical card scanner including a posting system, a reference datum interrogation circuit, controlled card retention means, three time delay relays of different periods for circuit control and a manual override.

13 Claims, 13 Drawing Figures

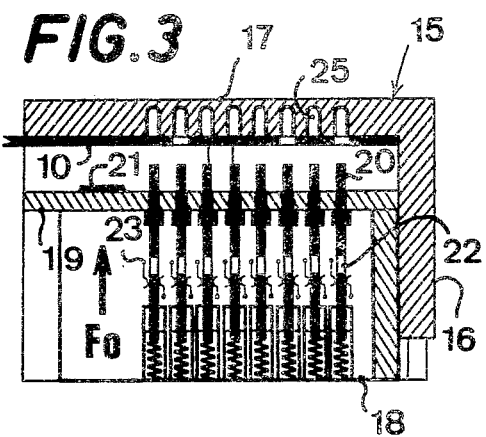
FIG.1
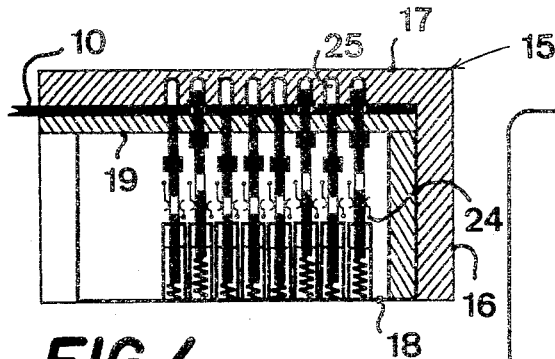
FIG.3
FIG.4
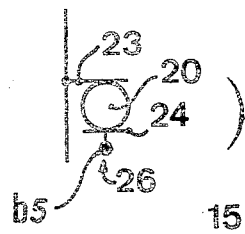
FIG.5
FIG.2

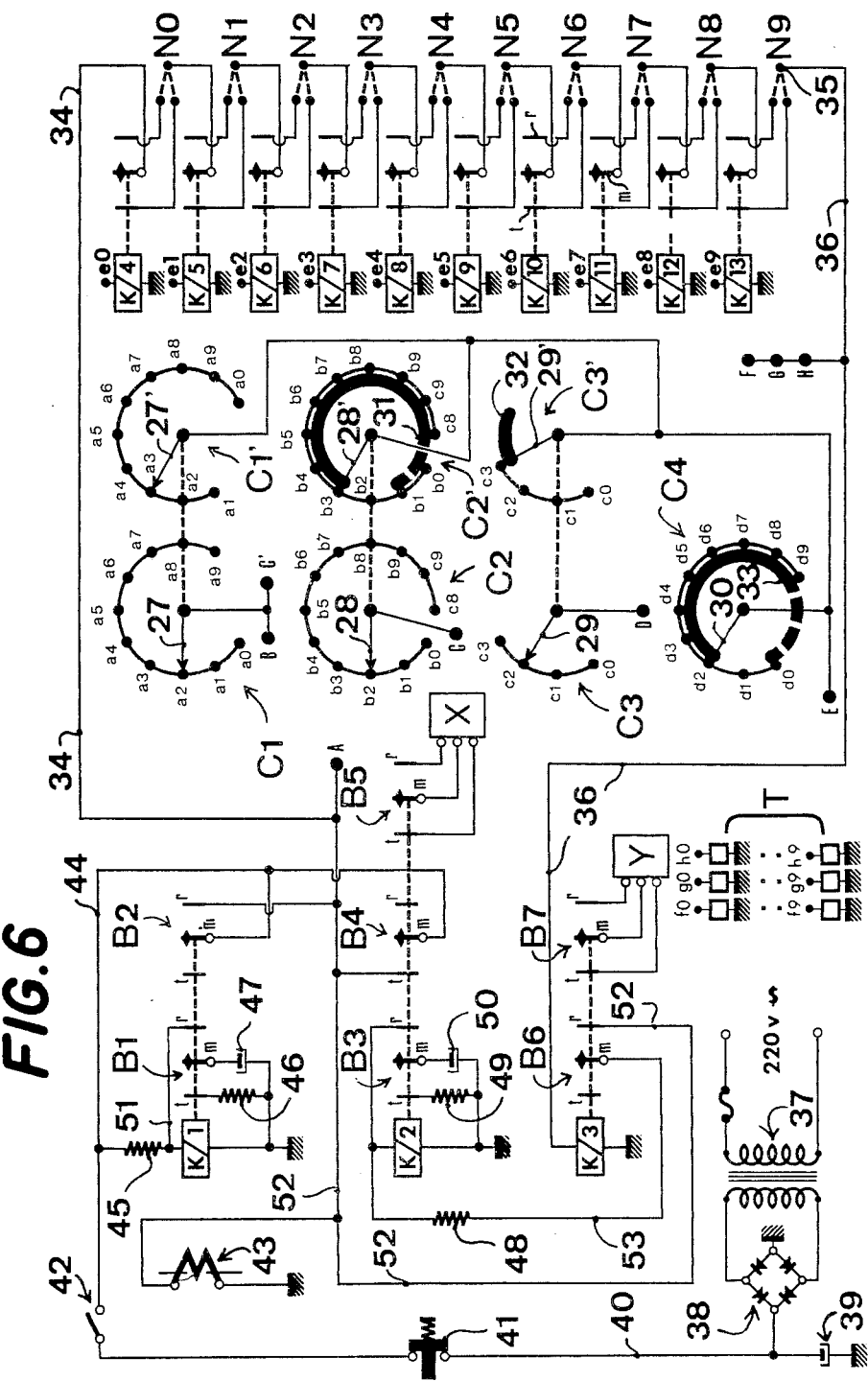

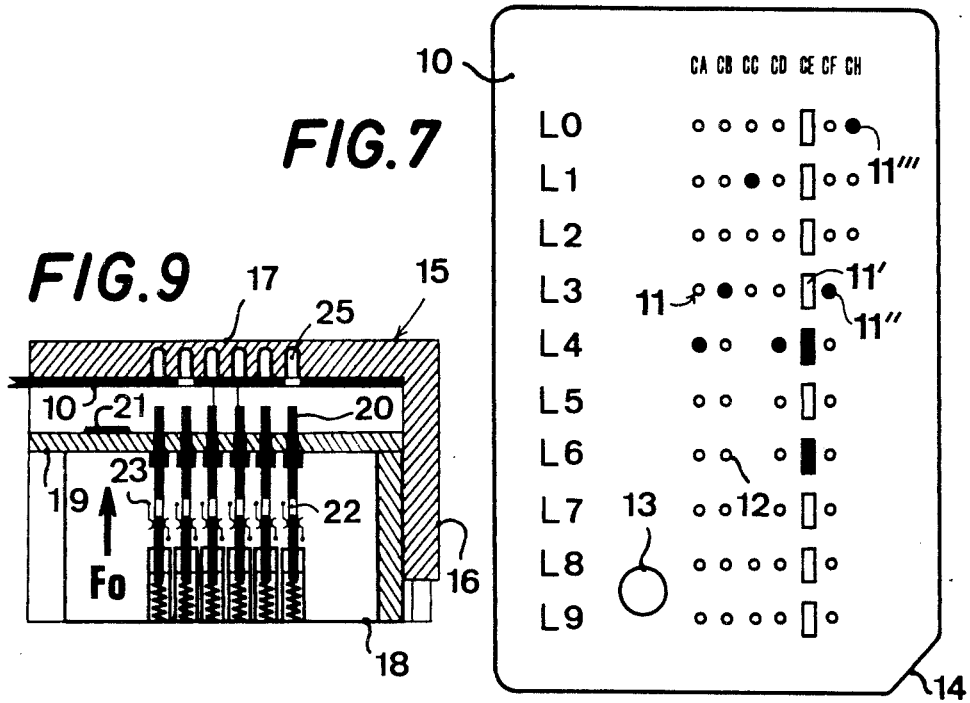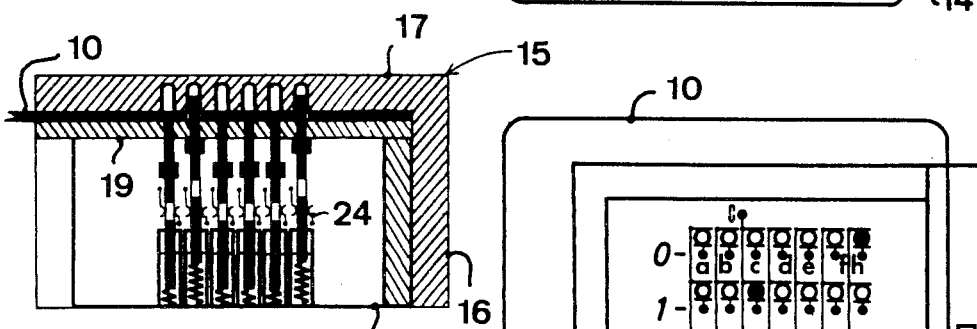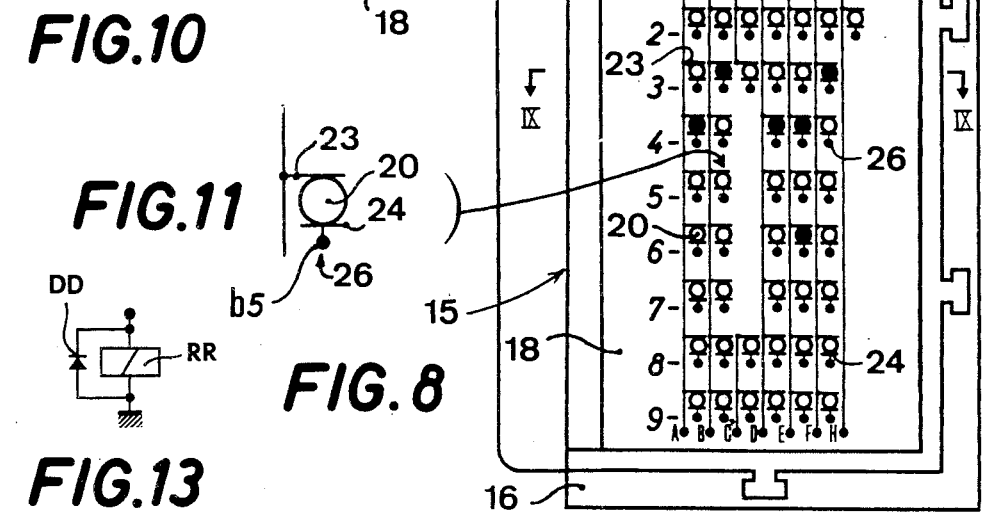

ELECTROMECHANICAL DEVICE FOR CHECKING THE VALIDITY OF PERFORATED CARDS

The present invention relates to an electromechanical device for checking the validity of perforated cards.

This device is intended more especially for checking the validity, with regard to time and place of use, of punched cards or "badges" that can be worn, and used as evidence of paid subscription in certain sports or recreation facilities, especially mechanical tows in ski stations. The device is likewise intended to transmit to totalizer elements the data entered on those of the said cards that have been recognized as valid.

Cards of this type, which are used more or less extensively, comprise a rectangular plate which is fabricated of plastic-coated board, plastic or the like, is rigid to a certain extent, and is of small size (less than 6 centimeters in width). It is generally possible to enter several decades of data on these cards, by punching or not punching locations ordinarily disposed in ten lines and several columns to the card (ten locations or loci to the column) according to a principle well known in regard to punched cards used in information handling techniques.

Certain devices have already been designed to select and read the cards in question. Most of these devices use static readers which require scrutiny of the card and memorizing of the data read from the card, thus necessitating the use of complicated electronic circuits with cumbersome components.

The device of the invention, in contrast, requires neither scrutiny of the card nor memorizing of the data entered thereon, to provide an efficiency equal at least to those of the prior art mentioned above. Further the device of the invention offers the advantage over those of the prior art of requiring only the use of a limited number of electromechanical components, which are judiciously designed so that cost is reduced to a fraction of that of the prior art devices.

In accordance with the invention an electromechanical device for checking the validity of perforated cards is provided, the device comprising a mechanical reader, which is known per se, and in which a card to be checked is received, for detecting the presence or absence of a perforation in each of the perforatable locations of the card by establishing or breaking electrical contacts individually associated with each of the locations. The device includes at least one posting system for at least one reference datum, and an interrogation circuit for interrogating at least one validation datum entered on the card and for producing an output voltage responsive to said validation datum conforming to said reference datum. The device also includes electromechanical means for retaining said card in said reader, and a utilization circuit responsive to the output of the interrogation circuit for controlling the release of the card by the electromechanical means. The utilization circuit itself comprises a first time delay relay which is supplied with direct current responsive to the introduction of a card in the reader for; in the inoperative state thereof, enabling energization of the interrogation circuit and the electromechanical means, a second time delay relay, having a time delay shorter than that of the first relay, for, in the operative state thereof, enabling energization of the interrogation circuit and the electromechanical means, and a third relay for inhibiting energization of said second relay responsive to said output voltage of said interrogation circuit. The device also includes manually operated means for disconnecting the first and second relays, the interrogation circuit and the electromechanical means so as to cause release of a card from the reader.

The device further comprises means for signalling the nonconformity of the validation data vis a vis the reference data, which is triggered by the energization of the second relay and commands closure of an access. In addition, a means for signalling conformity of the validation data with the reference data, triggered by energization of the third relay, commands the opening of the same access.

According to another feature of the device, the system for posting reference data comprises a series of rotary contact switches that enable posting of at least the number of the year, month, decade of days and unit of the day of use of the device, as well as an excess of tolerance with reference to these numers, and a series of manual switches which enable posting of the place or places of validity of the card that are to be recognized as valid by the device.

The device further comprises a circuit for providing an accounting of the documentary data entered on the card, which is only actuated if the validity of the card has been recognized.

The invention will be better understood, and other features and advantages thereof will appear more clearly with reference to the following description and the attached drawing which refer to two different forms of embodiment of the said device, cited as non limiting examples and intended especially to apply to mechanical tow facilities in ski stations.

In the drawing:

—FIGS. 1 and 7 show respectively a wearable card or badge which can be used as evidence of subscription and is intended to be checked by the device of the invention, according to first and second embodiments of the invention respectively.

—FIGS. 2 and 8 show schematically, seen from the back, the mechanical reader constituting the input to the device, according to the first and second embodiments respectively.

Figure 12:
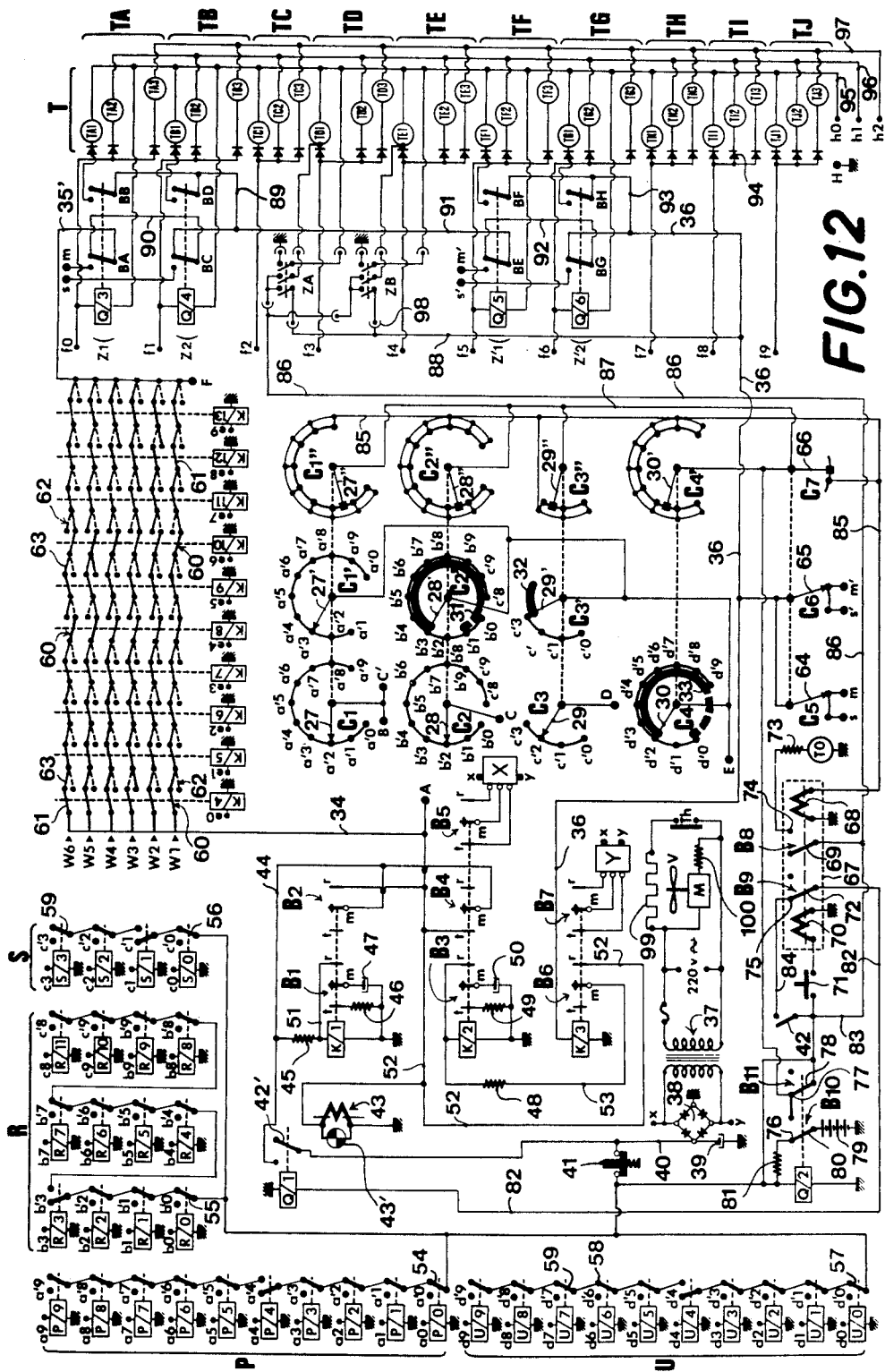

—FIGS. 3 and 4 and 9 and 10 schematic sections, taken along III—III and IX—IX respectively of FIGS. 2 and 8, of the reader shown, respectively, in FIGS. 2 and 8, —FIGS. 5 and 11 illustrate, on a larger scale, details of FIG. 2 and FIG. 8, respectively, —FIGS. 6 and 12 are schematic circuit diagrams of the first and second embodiments of the invention, and —FIG. 13 illustrates a detail of the device according to one of FIGS. 6 or 12.

For the sake of clarity of explanation, the elements of the device that are common to the two forms of embodiment have been given the same reference numbers in the drawing and are not to be described again in detail in the second form of embodiment.

The device of the invention allows checking of the validity of a paid subscription for mechanical ski tow, as evidenced by a wearable card or badge of the type mentioned above.

With reference first to FIG. 1, a card 10 is provided with eighty perforatable loci or locations disposed in eight columns CA, CB, CC, CD, CE, CF, CG and CH, parallel to the height of the card, and in ten lines L0, L1, L2, L3, L4, L5, L6, L7, L8 and L9, of which however four (CC/L4, CC/L5, CC/L6 and CC/L7) are not used. Those of columns CA, CE, CF, CG and CH are represented in the drawing by rectangular contours 11 according to which they can be perforated mechanically before delivery of the subscriber card. Those of columns CB, CC and CD are shown on the card itself by orifices 12, which are of small diameter, making it possible to center the punching tool used to make the circular perforations when the card is delivered.

Along columns CA, CB, CC, CD and CE there are entered on the card data of validation which allow definition of the limits of the validity of the card, whereas along columns CF, CG and CH there are entered documentary data which are intended to be disclosed if and only if this card validity is recognized. These documentary data may indicate the place of delivery of the card, price class (adult, child, special subscription rate etc) or any similar information.

In increasing order of lines L0 to L9, each of the perforatable loci of column CA is associated with the number of one of ten consecutive years, each of those of column CB with the number of one of the first successive ten months of the year: the last two loci (CC/L8 and CC/L9) of column CC are associated respectively with the months of December and November: the four first loci of column CC with the number (L0 = 0 to L3 = 3) of the decades of days of the month: each of those of column CD are associated with the number of units of each of the days of the month: finally, each of the loci of column CE is associated to a possible coding of the card, allowing identification of the authorized place or places of use of this card. By way of example, the validity of the card shown in FIG. 1 expires on 14 April 1972 and only allows use of mechanical tow no. 6, which is expressed respectively by the punches on the card of loci CC/L1, CD/L4, CB/L3, CA/L2 and CE/L6 shown in black on the said FIG. 1. A circular opening 13 and a clip 14 are made in a known way on card 10 to ensure its correct positioning in the reader of the device.

With reference now to FIGS. 2, 3, 4 and 5, the said reader 15 comprises a fixed frame 16 against the base 17 of which card 10 is placed, as well as a movable block 18, sliding on frame 16 which, by moving in the direction of arrow Fo, is intended to be applied against the said card 10 by its frontal part 19, metallic needles 10 mounted on springs so as to be telescopically retractable in said block 18, extend through frontal part 19, the number of needles 20 being equal in number to the number of perforatable locations, i.e. 76, and being disposed according to the same configuration as the perforatable loci of card 10.

The said frontal part 19 bears a circular protuberance 21 which is intended to be introduced into opening 13 of card 10 to hold the card in correct position when the reader 15 is closed (FIG. 4). Upon this closure, card 10 cause the needles 20 in register with non-perforated locations to be retracted, and on the other hand, allows each of the needles in register with one of the perforations to pass through the card. Each of needles 20 includes an insulating portion 22 and is retained between two contacts 23 and 24 that are integral with block 18. In the unretracted position, needle 20 establishes a conductive connection between contacts 23 and 24. In the retracted position of the needle, contacts 23 and 24 engage insulating portion 22 and this conductive connection is interrupted or broken. For the sake of clarity of the drawing, the contacts are shown in FIGS. 3 and 4, shifted by 90°. 76 blind orifices 25 made in the base 17 of frame 16, each opposite one of needles 20, receive the extremities of those of needles 20 that pass through card 10 after the closing of reader 15 (FIG. 4).

As FIG. 2 indicates, each of contacts 24 bears a terminal 26 characterized by a column letter ($a$, $b$, $c$, $d$, $e$, $f$, $g$, and $h$ corresponding respectively to columns CA, CB, CC, CD, CE, CF, CG and CH of the card) and a line numeral (0, 1, 2, 3, 4, 5, 6, 7, 8 and 9, corresponding respectively to lines L0, L1, L2, L3, L4, L5, L6, L7, L8 and L9 of the card). Thus, in FIG. 5, contact 24 of needle 20 whose end is on register with perforatable location or locus CB/L5, has terminal 26 with reference $b5$. As FIG. 2 indicates, and with the exception of those needles of the third column, the contacts 23 of the needles of an identical column are connected in parallel to the same terminal referenced A, B, D, E, F, G and H, respectively, for the 1st, 2nd, 4th, 5th, 6th, 7th and 8th columns. Contacts 23 of the last two needles of the third column are connected to terminal C', and those of the first four needles of this third column to terminal C.

In FIG. 3 there are shown needles 20 that correspond to perforatable loci of line L3 of the card and, in FIG. 4, the position of these needles upon closure of reader 15, the 2nd, 6th and 8th needles (starting from the left of the figure) pass through the card through the three perforations of line L3.

With reference now to FIG. 6, the device of the invention, aside from reader 15, comprises first and foremost a posting system for reference data which are in the present instance the date of the day of use of the device and coding data, e.g. those that characterize the place where this device is used. This system comprises two parts, each associated to one of the two above mentioned types of reference data: the first comprises four rotary contacts with wheel C1, C2, C3 and C4 and, respectively paired to each of the first three of these four contact devices, three other contact devices C1', C2' and C3', serving for posting the date of the day of use and for posting an excess of tolerance: the second comprises ten manual switches (N (N0, N1, N2, N3, N4, N5, N6, N7, N8, N9) to each of which there is associated a relay K4, K5, K6, K7, K8, K9, K10, K11, K12, K13, respectively, and serving for posting reference data (coding data) associated with the validation data (coding) entered on card 10. These are successively connected to the ten studs of contact element C1, terminals $a0$, $a1$, $a2$, $a3$, $a4$, $a5$, $a6$, $a7$, $a8$ and $a9$. To the ten studs of contact element C1' there are successively connected terminals $a1$, $a2$, $a3$, $a4$, $a5$, $a6$, $a7$, $a8$, $a9$ and $a0$. In the same way there are connected to the twelve studs of contact element C2 terminals $b0$, $b1$, $b2$, $b3$, $b4$, $b5$, $b6$, $b7$, $b8$, $b9$, $c9$ and $c8$ which, in the same order, are connected to the twelve studs of contact element C2'. There are connected in order, to the four studs of contact element C3, terminals $c0$, $c1$, $c2$ and $c3$ which are also connected in the same order to the four studs of contact element C3'. To the ten studs of contact element C4 there are connected, in order, terminals $d0$, $d1$, $d2$, $d3$, $d4$, $d5$, $d6$, $d7$, $d8$ and $d9$.

The rotary slide or contact 27 of contact element C1 is connected to terminals B and C', while the rotary slide 28 of contact element C2 is connected to terminal C. Rotary slide 29 of contact element C3 is connected to terminal D, and the rotary slide 30 of contact element C4 is connected to terminal E to which there are likewise connected rotary slides 27', 28' and 29', respectively, of contact elements C1', C2' and C3'. The last three slides 27', 28' and 29' are shifted ahead by one stud relative to respective slides 27, 28 and 29 with which they are paired. Each of the slides 28', 29' and 30 is provided with a conductive plate 31, 32 and 33, respectively, which is of arcuate shape and is intended to short circuit the contact stud against which it is applied together with all of the studs proceding that stud as illustrated. Contrary to what is indicated in FIG. 6 for the sake of clarity, it is thus necessary to provide, to allow complete angular disengagement of these plates, even when their slide is in contact with the last of the active studs of the wheel: 22 positions (whereof only the first 12 are provided with active studs) for contact elements C2 and C2', six positions (of which only the first four are provided with active studs) for contact elements C3 and C3' and 18 positions (of which only the first ten have active studs) for contact element C4. This disengagement is symbolized in the drawing by a broken line of plates 31 and 33. Thus designed, contact element C1 allows posting of the number of the year (among 10 consecutive years), contact element C2, that of the month, contact element C3 that of the decade of days, and contact element C4 the day unit, of the date of use of the device, here 22 March 1972. As will be more clearly seen from the explanation of the operation of the device, contact elements C1', C2', C3' and C4 are "excess" contact elements. This means that these elements allow recognition as valid of any card whose date for lapsing of validity is beyond the posted date.

Terminals e0, e1, e2, e3, e4, e5, e6, e7, e8 and e9 each end at the input of the excitation circuit of one of the ten relays, respectively K4, K5, K6, K7, K8, K9, K10, K11, K12 and K13, each excitation circuit being grounded. These relays allow control of the coding data, in this case the place of use of the device. Between their contacts t and r (operative and inoperative) is a movable contact arm or armature m. As FIG. 6 shows in broken lines, the armature m of one of these relays may be connected alternatively to operating contact t or inoperative contact r of the preceding relay by posting switch N of the latter. Thus, the posting of the place (mechanical tow no. 6 in the example in question) where the device is to be used is obtained by connecting, via switch N6, operating contact t of relay K10 to median m of relay K11.

Input conductor 34 is connected to the median of relay K4, and the output conductor 36 is connected to the midpoint or output terminal 35 of switch N9. Between these two conductors 34 and 36, a conductive connection can only be established if switch N of that relay K or those relays K (4 to 13) that is/are energized, i.e. whose median is swung against the operating contact, connects the said operating contact to the median of the next relay and if the switch of each of the other non energized relays, i.e. those whose median remains applied against the inoperative contact, connects the inoperative contact thereof to the median of the following relay.

Input conductor 34 is connected, at its other extremity, to terminal A, whereas the output conductor 36 is connected at the same time to terminals F, G and H. The circuit formed by the input conductor 34, its conductive connection with output conductor 36, via switches N (0 to 9) (FIG. 6), the conductors that connect terminals A, B, C, C', D and E to the different contacts 23 (FIG. 2), the conductive needles 20 (FIGS. 2, 3 and 4), the various contacts 24 and their terminals 26 (FIGS. 2, 3, 4 and 5), the slides 27, 27', 28, 28', 29, 29' and 30 and output conductor 36 (FIG. 6), constitute the interrogation circuit for validation data entered on card 10. This interrogation circuit, supplied with direct current by input conductor 34 only delivers an output voltage, via conductor 36, if the validation data entered on card 10 conform with all data posted as a reference in the posting system. The device is provided moreover with a system T of pulse totalizers, which store and sum the documentary data entered along the columns CF, CG and CH of card 10, if and only if the validity of this card is recognized, i.e. if the output conductor 36 is energized. The input of the excitation circuit of each of these pulse totalizers is connected to a terminal 26 (f0 to f9, g0 to g9 and h0 to h9) and its output ends at ground.

The circuit of FIG. 6 is supplied with direct current at a voltage of 24 volts, by means of a transformer 37 connected to the 220 volt system, a diode rectifier bridge 38, whose output is provided with a filter capacitor 39, and a conductor 40 which, via a manual pressure switch 41 constituting the said interrupting means, is connected to a breaker 42 housed inside reader 15 and rigidly connected to its frame 16. When there is no card, this breaker 42 is open and disconnects the supply to the system which is provided by a supply conductor 44.

An electromechanical control unit including an electro magnet 43, when the said magnet 43 is energized, causes closure of reader 15 (FIG. 4) and the blocking of the card 10, applying, in the direction of arrow Fo (FIG. 3), mobile block 18 against the said card 10, previously introduced into the said reader 15.

The device finally comprises a circuit for utlizing the results of the check of validity of card 10 resulting from interrogation of the validation data born by the said card. This utlization circuit, which is an important feature of the invention, comprises a first time delay relay K1 with two paired two-state switches or flipflops B1 and B2; a second time delay relay K2, with a time delay that is less than that of the said first relay K1, with three paired two-state switches or flipflops B3, B4 and B5: a third relay K3, not timed, with two paired flipflops B6 and B7; a signalling system X which indicates non conformity of the card, triggered by the third flipflop B5 of the second relay K2 and finally a system Y for signalling conformity of the card, triggered by the second flipflop B4 of the third relay K3. Each of the flipflops (B1 to B7) of relays K1, K2 and K3 comprises a relay controlled armature m, a non operative contact r on which the said armature m is applied so long as the relay is not energized and an operative contact t against which the said armature m is applied when the relay is energized.

A supply conductor 44 is connected to one of the ends of a resistor 45 whose other extremity is connected to the exciter circuit of first relay K1 and, via a conductor 51, to inoperative contact r of its first flipflop B1, to armature m of the second flipflop B2 of the said first timed relay K1 and to median m of the second flipflop B4 of the second timed relay K2.

Terminal A, to which input conductor 34 is connected, is connected, by means of a conductor 52 to inoperative contact r of flipflop B2, to the operative contact t of flipflop B4, to the exciter circuit of electromagnet 43, which is grounded, and to the inoperative contact r of the first flipflop B6 of the third relay K3.

Armature m of flipflop B6 is connected by a conductor 53 and across a resistor 48 simultaneously to the exciter circuit of the timed second relay K2 and to inoperative contact r of its first flipflop B3.

Output conductor 36 is connected directly to the exciter circuit of the third relay K3. The exciter circuits of relays K1, K2 and K3 are grounded as shown.

At least one of contacts t or r and armature m of the third flipflop B5 of the timed second relay K2 are connected to the triggering circuit, which is not shown in the drawing but which is known per se, of system X which indicates the nonconformity of card 10.

In the same way, at least one of contacts t or r and median m of the second flipflop B7 of the third relay are connected to the triggering circuit, which is not shown in the drawing but which is known per se, of system Y for signalling the conformity of card 10.

To contact t and median m of flipflop B1 there are respectively connected a resistor 46 and a polarized capacitor 47 which terminate at ground.

In the same way, a resistor 49 and a polarized capacitor 50 that end at ground are respectively connected to contact t and median m of the first flipflop B3 of the second timed relay K2.

The timing of relays K1 and K2 is effected by RC circuits constituted respectively by resistor 45 and polarized capacitor 47 connected in series in the inoperative position of relay K1, and by resistor 48 and polarized capacitor 50 connected in series in the inoperative position of relay K2, resistors 46 and 49 having as their function the absorption of the discharge of their associated capacitors 47 or 50 when the corresponding relay passes to its operative position.

By giving the same value to resistors 45 and 48, according to a requirement of the invention, there is attained a timing of second relay K2 that is less than that of first relay K1, by selecting a value for capacitor 50 that is less than that of capacitor 47.

The device just described in its preferred form of embodiment, when placed at the start of mechanical tow no. 6 of a ski station on 22 March 1972, by way of example, functions in the way that is now to be explained.

The person in charge of this device posts, by manipulation of rotary slides 27, 28, 29 and 30 of contact elements C1, C2, C3 and C4 respectively, the date 22 March 1972, and by manipulation of switch N6 he connects contact t of relay K10 to median m of relay K11, which corresponds to the posting of the reference datum of place of use of the device (mechanical tow no. 6).

The holder of the subscription represented by card 10, on which the date 14 April 1972 is punched as expiration date of the said subscription and hence of the validity of the card, introduces the card into reader 15 (FIG. 3). This introduction of the card causes closure of breaker 42 which energizes conductor 44 and, progressively, relay K1 which, being timed, still remains in its inoperative position. The armature m of each of flipflops B2 and B4 is connected to terminal A, through contact r of flipflop B2 on which armature m of this same flipflop B2 is applied, so as to provide energization of input conductor 34 and conductor 52 and hence of electromagnet 43, then closing reader 15 (FIG. 4), with card 10 therein. Contact r of flipflop B6 is also energized which, by means of the armature m of this same flipflop in contact therewith, through conductor 53, gradually charges capacitor 50 across resistor 48, timed relay K2 still remaining in its inoperative position.

Upon closure of reader 15 (FIG. 4) needles 20 whose section is represented in black in FIG. 2 pass through the card through the perforations that are indicated in black in FIG. 1, thus establishing contact between, respectively (FIG. 2): terminal A and terminal a2, terminal B and terminal b3, terminal C' and terminal c1, terminal D and terminal d4, terminal E and terminal e6 and, corresponding to the documentary data entered on the card, terminal F and terminal f3, terminal G and terminal g8 and terminal H and terminal h3.

The energizing of terminal A thus causes, via terminal a2 and slide 27, energization of terminals B and C', which provides conformity of the number of the year of validity of the card with that of the year posted by contact element C1.

The energizing of terminal B causes, via terminal b3 and slide 28' of excess contact element C2', the energizing of terminal E which, via terminal e6, energizes relay K10. Relay K10, in turn, cause the armature m thereof to engage its operative contact t thus establishing, by means of switches N0 to N9, and circuits of other relays K4 to K9 and K11 to K13, a connection between input conductor 34 and the output conductor 36 so that the latter is energized, which simultaneously indicates the conformity, by excess, of the other validation data entered on the card with the other reference data that have been posted, and consequently the validity of the card.

This energizing of output conductor 36 causes excitation of relay K3 which causes movement of armature m of its first flipflop B6 into contact with operating contact t of the said flipflop, thus disconnecting the supply for timed relay K2 via conductor 53, so that timed relay K2 is thus inhibited before being energized, and meaning that relay K2 therefore cannot actuate system X for signalling nonconformity of the card. At the same time armature m of flipflop B7 moves from contact r to contact t of this flipflop which, either because of the breaking of connection m/r or because of the establishing of connection m/t, causes triggering of system Y for signalling conformity of the card, which may for example involve the release of an access to the mechanical tow, by opening a gate.

Simultaneously, conductor 36 energizes terminals F, G and H which, respectively and by means of terminals f3, g8 and h3 energize the three corresponding pulse totalizers of system T which record and thus account for the documentary data borne (in black in FIG. 1) by columns CF, CG and CH of the said card 10.

At the same time, capacitor 47 charges across resistor 45 and by means of contact r and median m of flipflop B1 which are applied, up to the time at which the voltage on the terminals of this capacitor reaches that for triggering timed relay K1 which when energized, causes armature m to engage contact t of the said flipflop B1, thus allowing discharge of capacitor 47 across resistor 46 and, simultaneously, causes armature m of flipflop B2 to move from its contact r to its contact t, thus breaking the supply to the rest of the device by conductor 52 and input conductor 34, especially that of electromagnet 43 which opens reader 15 and releases card 10.

This functioning of the device is repeated in a similar way so long as on the one hand the coded data on the card correspond to the posted reference data, posted by one or more of switches N (0 to 9) and on the other hand the card expiration date is that which has been posted by contact elements C1, C2, C3 and C4 or a later date, prior however to 31 December of the year following that of the posted date. Thus, delivery of voltage to terminal E is effected directly by means of contact elements C1, C2, C3 and C4 alone if the expiration date of the card is that which is posted, or by means of one of the excess contact elements C1', C2', C3' or C4 if this date is, as in the cited example, later than the posted date but prior to 31 December of the next year.

On the contrary, if the card is not valid, i.e. if the coded datum or data posted on it do not correspond to the datum or data posted by one or more switches N and/or if the expiration date is prior to the posted date or, if the case may be, later than 31 December of the year following that of the said posted date, no voltage would appear on output conductor 36. This results from a break of the conducting connection between conductors 34 and 36 caused, respectively, either by coding data on the card that do not agree with the posted data such as where, in the cited example, this coding does not correspond to the reference datum characterizing mechanical tow no. 6, or by absence of voltage on terminal E because of lack of connection between one or more pairs of contacts 23/24, caused by nonconformity, at least by excess, of the expiration date of the card with the posted date. In this case, relay K3 is not energized and therefore cannot trigger system Y for signalling conformity of the card. Further, the voltage supply is maintained to capacitor 50 via conductor 53, resistor 48, contact $r$ and median $m$ of flipflop B3. As soon as the voltage at the terminals of this capacitor 50 reaches the triggering voltage of timed relay K2, this relay is energized (before relay K1 whose interval is longer), moving armature $m$ into engagement with contact $t$ of the said flipflop B3 and thus allowing capacitor 50 to discharge across resistor 49. Simultaneously, armature $m$ of flipflop B4 is moved onto contact $t$ of the said flipflop and ensures supply via conductor 52 to electromagnet 43 thereby holding reader 15 closed, and thus retaining the card whose validity is not recognized. At the same time, armature $m$ of flipflop B5 is moved into engagement with contact $t$ thereof which, either because of breaking of connection $m/r$ or because of the establishing of the $m/t$ connection, causes triggering of system X for signalling nonconformity of the card. This system can put into action an optical or acoustical warning and cause blocking of access to the mechanical tow mentioned above, by maintaining the closing of a barrier. Holding of card 10 in reader 15 and this actuation of system X for signalling nonconformity of the card continue even after the swinging of timed relay K1 which intervenes after the swinging of relay K2 and cannot be interrupted except by breaking of the supply circuit of the device, deliberately, effected by pressure on manual breaker 41. This breaking of the supply circuit of the device, interrupting energizing of electromagnet 43, causes opening of reader 15 from the action of recall means that are not represented, and freeing of the nonvalid card.

This freeing of the card, which is automatic if it is recognized as valid, and deliberate in the contrary case, entails its ejection and the opening of breaker 42 which reestablishes relays K1, K2 and K3 in their original inoperative state and makes the device able to check the validity of another card.

The device can be made automatic of course, independent of the form of embodiment in question, by use of independent supply.

The second form of embodiment which is now to be described is an improved version of the device which, in addition to the possibilities already offered by the earlier form of embodiment, makes it possible to make ineffective attempts at fraud, intended to extend the duration of validity by fraudulent supplementary punches on the subscription card. It also allows acceptance as valid not only of subscription cards subscribed for the single place of use of the device but also those subscribed for other places that each use an identical device. It can post supplementary reference data for control of restricted validation data that may be entered on the card (half-day subscription, morning or afternoon). It can totalize successive changes of date posting (revealing any tentative fraud in these changes) and finally it can effect separate accounting for statistical purposes and for showing the account, of each type of payment recognized as valid for the device.

If we refer now to FIG. 7, we see that the perforatable locations or loci 11, 11' of card 10 according to the second form of embodiment of the invention are distributed only in seven columns CA, CB, CC, CD, CE, CF and CH, along ten lines L0, L1, L2, L3, L4, L5, L6, L7, L8 and L9. As in the former embodiment, the first four columns are used for entering data that define the limit date of validity of the card, in the form of circular perforations made by a punch. The ten perforatable loci 11' of column CE are reserved for binary entry, in the form of rectangular perforations, of a coding datum that defines the place of validity of the subscribed payment. This place may correspond to a single place of use authorized by the card (e.g. a specific tow) or to several defined places that constitute a group (e.g. all the tows at a single station). By summing the combinations of perforations of the ten perforatable loci of this column CE, we see that this place of card validity may be selected from among $$\sum_{p=1}^{p=10} C_{10}^{p} = 2^{10-1} = 1023$$

possible places, excluding the card that has no perforation according to column CE. The absence of perforation is noted "0" and the presence of perforation "1": therefore according to usual binary notation, the place of validity of card 10 is represented by the number "0000101000". The perforatable places of columns CF and CH serve for entry on the card of documentary data that each characterize a type of payment and are intended to be accounted by the device for statistical purposes or for showing the account. Each of these documentary data comprises two perforations, one in column CF, the other in column CH. Of these, four data represented respectively in the example under consideration by punches in loci CF/L0 and CH/L0, CF/L1 and CH/L0, CF/L5 and CH/L0, CF/L6 and CH/L0 are additionally used as data of restricted validation (morning or afternoon) for half day payments, the first two for morning or afternoon payments made for the place of use of the device, and the last two for morning or afternoon payments made for the whole station grouping several possible places of use. Only the first three perforatable loci of column CH are used, so that by associating each of these three loci with each of the ten perforatable loci of column CF it is possible to enter on these two columns CF and CH up to thirty documentary data among which, by way of example, there is to be shown, aside from the four data already mentioned, at least one documentary datum for payments by the day entered only for the place of use of the device, seven documentary data for the next seven, entered for the whole station: 1 day, 2 consecutive days, 4 consecutive days, 6 consecutive days, for residents, for instructors, for guests; as well as three documentary data for the following subscribed simultaneously for several stations (e.g. of a single region): 4 consecutive days, 6 consecutive days, and for instructors.

In FIGS. 8, 9, 10 and 11, reader 15 has 59 conductive needles 20 disposed according to the same configuration as the perforatable loci used on card 10.

With reference now to FIG. 12, we see that the device comprises, in addition to the said reader 15, a date posting system, a card locking device, and a circuit for utilization of the results of interrogation of validation data identical to those of the earlier form of embodiment. It also has a half-day posting system, a system that allows refusal of any card whose validation has been fraudulently extended, an accounting system for changes of date and half-day, as well as a system for posting reference coding data and an accounting system for documentary data: these are improved systems, which are to be described.

The supply for interrogation and utilization circuits is effected by means of a relay Q1 which is energized by the closing of breaker 42, actuated by introduction of the card, the movement of the armature 42' of said relay Q1 causing a voltage to be supplied to conductor 44. An alternating voltage, appearing at terminals $x$ and $y$ of the secondary of transformer 37, provides a supply for a system X for signalling non conformity and for a system Y for signalling conformity of the validation data borne by the card and the posted reference data. On the 220 volt sector there are corrected, in parallel, a motor M of a fan V in series with its protective resistor 100, and a heating resistor 99 in series with a thermistor Th which energizes the said heating resistor 99 as soon as the ambient temperature goes below a specific reference temperature. Fan V is permanently actuated. The electromagnet 43 which constitutes the active part of the card blocking device is connected in parallel with a control lamp 43', which is a signal lamp.

The interrogation circuit is provided with a set of relays P0 to P9, R0 to R11, S0 to S3 and U0 to U9, grouped in four P, R, S, U series, each associated with one of the four elementary validation data that completely define the limit date of validity of card 10 (year numbers, numbers of month, day decades and day units for expiration). The exciter circuit of each of these relays, which is grounded, is connected to terminal 26; $a0$ to $a9$; $b0$ to $b9$; $c9$ and $c8$; $c0$ to $c3$; $d0$ to $d9$ of one of contacts 24 of reader 15 which are associated with perforatable loci 11 according to which validation data can only be entered. Only switch arms or armatures 54, 55, 56, 57 of relays P0, R0, S0, U0 of each of these series P, R, S, U, which are associated with a perforatable locus L0/CA, L0/CB, L0/CC, L0/CD, reserved in each column for the validation datum of the lowest number, are supplied with direct current across manual breaker 41. Inoperative contact 58 of each of the successive relays of a single series is connected to an armature 59 of the next relay of the same series. Armatures 59 of these successive relays are thus, in their inoperative position, supplied in sequence from 54, 55, 56, 57 of the first relay P0, R0, S0, U0 respectively of the series in question. The operative contacts $a'0$ to $a'9$; $b'0$ to $b'9$; $c'9$ and $c'8$; $c'0$ to $c'3$; $d'0$ to $d'9$, are connected to the posting system for reference data (date of use of the device) that correspond. This assembly of relays is designed in such a way that the reading of the validation data that define the effective limiting date of validity of card 10, causing the energization of a single one of the relays (here P4, R3, S1 and U4) of each of the said series P, R, S, U, and excitation of their operative contacts $a'4$, $b'3$, $c'1$ and $d'4$, interrupts the supply to armatures 59 of the following relays, respectively P5 to P9, R4 to R11, S2 and S3, U5 to U9, of the same series, thus preventing excitation of the operative contact of any one of the following relays of the same series that could have been energized the simultaneous reading of validation data of numbers that are higher, and fraudulently punched in card 10, thereby rendering such an attempt at fraud ineffective.

The interrogation circuit is additionally provided with a group of ten relays K4 to K13, each associated with one of the perforatable loci 11' of the card that are reserved for entry of coded data defining the place of validity of the card, and each comprising six two position (bistable) switches or flipflops 60. This number of flipflops to the relay is equal to that of the places of validity of the card that is desired, to have recognized as also valid by the device. Armatures 61 of flipflops 60 of first relay K4 are connected in parallel with input A of the interrogation circuit and the exciter circuit of each of these relays, which is grounded, is connected to output $e0$ to $e9$ of one of the contacts of reader 15 that are associated with the said latter perforatable loci 11' of the card. In a parallel way, the posting system has a battery of 60 manual switches 62 with two positions, their number being equal to that of all flipflops 60. Each of these switches is associated with one of flipflops 60 of one of the relays and its median 63 connects either the operative contact or the inoperative contact of this flipflop to the median 61 of the flipflop of the same row of the following relay, so as to be able to connect in sequence the flipflops 60 of the same row of successive relays according to so many rows W1, W2, W3, W4, W5 and W6, independently of the fact that each relay has flipflops 60. Armatures 63 of switches 62 associated with flipflops 60 of the last relay K13 are connected in parallel to output F of the circuit for posting coded data and, indirectly via conductors 35, 90, 91, 92, with output 36 of the interrogation circuit. By manipulation of switches 62 of the same row (W1 to W6) it is thus possible to post reference data that define, among $2^{10-1} = 1023$ possible combinations, one of the places where the card is valid that is to be made recognizable by the device. Thus among 1023 possible places it is possible in the example in question to make recognition possible up to six different places. In the present case, these six places, in increasing order of the rows are represented by the binary numbers: 0000101000 (which is the place of validity of card 10 and for example that of utilization of the device), 0010000010, 1000011100, 0000000010, 0000110000, 0000001000.

This posting system comprises also two contacting elements C5 and C6 which have two positions, and which are paired, each allowing the posting of morning or afternoon of the day of use of the device, by virtue of which it is possible to check the cards whose validity is limited to one of the half days of this day. The successive studs of the stationary or fixed contacts of each of the first four contact elements C1 to C4 and, for each of the first three of them, the contact studs of their excess contactors C1', C2', C3', are connected to operative contacts $a'0$ to $a'9$; $b'0$ to $b'9$; $c'9$, $c'8$; $c'0$ to $c'3$; $d'0$ to $d'9$, of the successive relays of one of the four series P, R, S, U of the assembly of relays already described. The two studs $s$, $m$ and $s'$, $m'$ of each of the two-position contact elements C5 and C6 are each connected to a separate interrogation circuit Z1, Z2 and Z'1, Z'2 respectively.

Slides 64 and 65 of the two-position contact elements C5 and C6 are connected to output 36 of the interrogation circuit.

The device is also provided with a totalizer system for changes of posting of date and half day. This system comprises on the one hand, each paired with one of the contact elements for posting the year C1, the month C2, the day decade C3, the day unit C4 and the half day C5 and C6, five rotary contact elements C1'', C2'', C3'', C4' and C7 respectively, whose respective rotary contacts or slides 27'', 28'', 29'', 30'' and 66 are shifted to the back by a half step with reference respectively to slides 27, 28, 29, 30 of the corresponding posting contact element. These slides are simultaneously supplied with direct current by conductor 87.

This system likewise comprises a bistable relay 67 with two flipflops B8 and B9, of which the first coil 68 is connected at the same time to each of the studs of these five contact elements by conductor 85 and is connected to ground. Armature 69 of the first flipflop B8 is supplied with direct current by conductor 83 across manual breaker 41. The second coil 70, which is grounded, can only be energized by closing of a manual contact element 71, at the output of manual breaker 41. The totalizing system comprises finally a counter T0 which is incremented by one unit responsive to the making and breaking of the connection between its exciter circuit which is grounded, and that one of the two contacts, namely 74, of the first flipflop B8 on which its armature 69 is applied when the first coil 68 is energized. Armature 72 of the second flipflop B9 is connected to relay Q1, which has already been mentioned, by means of a conductor 82. Contact 75 of this flipflop B9, which is engaged by armature 72 when the said second coil 70 is energized, is connected to the output of a breaker 42, by a conductor 84. Thus, any change of posting of date and/or half day, by passage of the slide of at least one of the five contact elements C1'', C2'', C3'', C4' or C7 on one of the studs of its stationary contacts generates a pulse that is sufficient to energize the first coil 68 which, through armatures 69 and 72, causes on the one hand, supply to counter T0 via median 69 and on the other hand, via median 72, the interruption of the supply to the interrogation and utilization circuits. This supply cannot be reestablished except by pressure on manual contact element 71 which, by causing excitation of second coil 70, causes restoration of bistable relay 67 to its original state and addition of one unit by the counter T0 whose total can be compared at any time to the number of days or half days that have effectively passed since its last resetting to zero. This totalizer system allows especially the detection of any wrong posting of the date or half day effected in an attempt to gain accceptance by the device of cards whose validity limit has already run out. A resistor 73 protects this counter, and the counter is connected to ground.

The totalizing system for date and half day changes is provided with an auxiliary emergency circuit which allows start-up of the action if the device is no longer supplied by the network sector. This circuit comprises on the one hand a relay Q2 with two flipflops B10 and B11, supplied with direct current across manual breaker 41. The operative contact 76 of first flipflop B10 is supplied from the same source and the inoperative contact thereof is connected to the operative contact 77 of second flipflop B11 which is also connected to each of slides 27'', 28'', 29'', 30' and 66 respectively of the five contact elements C1'', C2'', C3'', C4' and C7. Armature 78 of the second flipflop B11 is also connected to the supply for relay Q2 as well as to armature 69 and to the input contacts of manual contacting element or control switch 71 and circuit breaking switch or breaker 42. This circuit moreover comprises a storage battery 79 whose positive pole or terminal is connected to armature 80 of flipflop B10 and whose negative pole is grounded. When the device is supplied from the system power supply, relay Q2 is energized and charges battery 79 across a protective resistor 81 and, via armature 78, also causes the energizing of the slides of the five contact elements C1'', C2'', C3'', C4' and C7 as well as, directly at the output of manual breaker 41, the energizing of the inputs of manual contacting element 71 and breaker 42 and, by means of conductor 83, the input of armature 69. When the device is no longer supplied by the system supply, relay Q2 is no longer energized and the slides of the six preceding contact elements are then supplied by storage battery 79 across armature 80. The rotation of at least one of the rotary contact arms or slides (27'', 28'', 29'', 30' or 66) causes excitation of coil 68 and the closing of the supply circuit of the counter T0 by armature 69. Only the reestablishment of supply to the device by the system supply allows supply of the counter T0 which then increases the count thereof by one unit per interruption of its supply circuit following excitation of coil 70 under the effect of a pressure that has to be exerted on manual contact 71 to reestablish supply of the interrogation and utilization circuits. The response time of this coil 70 is made longer than the response time of counter T0 so that the latter always will have time to be supplied before its supply circuit is broken, even if manual contact element 71 is pressed before the supply of the device via the network has been reestablished.

The device of the invention comprises also an accounting circuit T constituted by a group of 30 pulse counters which can separately totalize each of the different documentary data borne by cards 10 that are introduced successively into reader 15. These 30 counters are distributed in ten discrete series TA, TB, TC, TD, TE, TF, TG, TH, TI, TJ, each comprising three counters TA1, TA2, TA3, TB1, TB2 ... T12, T13, TJ1, TJ2, TJ3. Except for series TA, TB, TF, TG, the inputs of each of the three pulse counters of a single series are connected in parallel across a diode 94 to the output $f2$, $f3$, $f4$, $f7$, $f8$, $f9$ respectively of the same row of one of contacts 24 of reader 15 associated with perforatable locations or of column CF. The outputs of the pulse counters of the same row of these different series are connected in parallel by three conductors 95, 96, 97, respectively for the counters of row 1, of row 2, of row 3 of each of these series to outputs $h0$, $h1$, $h2$ of one of the three contacts 24 of reader 15 associated with the three perforatable loci of column CH of the card. Corresponding contacts 23 are, at their input H, connected to ground. The simultaneous reading of two perforations (on CF and CH) of the card which constitute one documentary datum, causes excitation of one of these counters, in this case TD1, which is then incremented, i.e., adds one unit. Separate circuits Z1, Z2, Z'1, Z'2 are associated respectively to pulse counters TA1, TB1, TF1 and TG1, reserved for accounting of morning documentary data (counters TA1, TF1) and afternoon (counters TB1, TF2). Circuits Z1 and Z2, which are associated with pulse counters TA1 and TB1, are used for interrogation of two of these documentary data which serve also as validation data for morning or afternoon, characterizing half day payments for the place of use of the device. Circuits Z'1 and Z'2, associated with pulse counters TF1 and TG1, are used for interrogation of two other documentary data also serving for validation data for morning or afternoon, characterizing payments for a group of places (station), whereof in particular that where the device is used. Each of these circuits Z1, Z2, Z'1, Z'2, is constituted by a relay Q3, Q4, Q5, Q6 with two flipflops BA, BB; BC, BD; BE, BF; BG, BH whose exciter circuit is connected between outputs $f0$, $f1$, $f5$, $f6$ and $h0$, $h1$, $h2$ respectively of contacts 24 of reader 15, these contacts being associated with the two perforations CF and CH of card 10 which constitute the documentary datum and morning or afternoon validation that corresponds. The operating contact of the first flipflop BA, BC; BE, BG is connected to the corresponding stud $s$, $m$; $s'$, $m'$ of contact element C5 or C6, whereas its inoperative contact is connected at least indirectly by conductors 90, 91 and/or 92 to output 36 of the interrogation circuit. The armature of this first flipflop is connected at least indirectly by conductors 92, 91 and/or 90 and 35' to output F of the circuit for posting coded data. The operative contact of the second flipflop BB, BD, BF, BH is connected to the input of pulse counter TA1, TB1, TF1, TG1 that corresponds, whereas the armature of this second flipflop is connected at least indirectly by conductors 89, 91 and/or 92 to output 36. The inoperative contact of flipflop BA or BE is connected by one of the two conductors 90, 92 to the armature of flipflop BC or BG respectively. The inoperative contact of flipflop BC is connected by conductor 91 to the median of flipflop BE. Pulse counters TA2, TA3; TB2, TB3; TF2, TF3; TG2, TG3 are connected across a diode 94 between the outputs $f0$, $f1$, $f5$, $f6$ and one or the other of conductors 96 or 97 respectively.

For the presence, on the card, of documentary data and data for validation of half days, relays Q3, Q4, Q5, Q6 are not energized and a conductive connection is established directly by the armatures of their first flipflops, between output F and output 36, allowing excitation of the third relay K3 if all the other data of validation of card 10 conform to the posted data. For the presence, on the card, of a datum of validation of morning or afternoon corresponding to that posted by contact elements C5 and C6, the reading of each of the two perforations constituting this datum allows excitation of only one of the said relays Q3, Q4, Q5, Q6 whose energization allows, via the armature of its first flipflop and the slide of one of contacting elements C5 or C6, connection of output F to output 36. If all the other validation data of card 10 are in conformity with the posted data, the excitation of the third relay K3 through the armature of the second flipflop of the only relay that is energized, causes an increase by one unit the count in the pulse counter associated with the said relay and, simultaneously, the prevention of accepting of a card bearing validation data for morning and afternoon resulting from a fraudulent making of extra perforations of an afternoon validation when the validity of this card is limited to the morning. Relays Q3 and Q4 or Q5 and Q6 are simultaneously energized, excitation of the first (Q3 or Q5) interrupting upstream the conductive connection established by the second (Q4 or Q6) between output F and output 36. In the same way, the configuration of the circuit makes a fraudulent attempt to indicate payments for a half day subscribed only for the place of use of the device to other places in the group ineffective. Such an attempt in fact causes not only the energization of one of the first flipflops BE or BG of one of relays Q5 or Q6 but also the energization of one of flipflops BA or BC of one of relays Q3 or Q4. The latter results in breaking of the connection established between output F and output 36 by energizing one of flipflops BE or BG, thus preventing acceptance of a card on which has been tampered with to indicate payment beyond that which has actually taken place.

Finally, the device may be supplemented by one or more auxiliary devices that allow actuation of system Y (signalling conformity) causing for example the opening of an access gate without introduction of a card in reader 15, namely to authorize passage of individuals who have tickets, and allowing the counting of these passages. In FIG. 12 these elements are constituted by two tripolar contact devices with pushbuttons ZA and ZB, located outside the case of the device and connected by plug switches 98. Each of these two contact elements ZA and ZB is associated with one of the pulse counters TD1 and TE1 and joined between a supply conductor 86 connected to the output of manual breaker 41 and a conductor 88 that is connected to the output 36 of the interrogation circuit. Each of these two contact elements ZA and ZB can thus be associated with one of two types of tickets, e.g. with different rates. Pressure on the pushbottons short circuits the interrogation circuit of the device, directly energizing relay K3 which actuates the said system Y (signalling conformity) while the corresponding pulse counter TD1 or TE1 receives an increment of one unit.

With reference to FIG. 13, we see that each of relays RR shown in FIGS. 6 and 12 is provided with a diode DD connected in parallel on its exciter circuit in the blocking direction with reference to the supply voltage of this circuit, so as to avoid formation of breaking arcs upon opening the said circuit.

What is claimed is:

1. An electromechanical device for checking the validity of perforated cards, said device comprising a mechanical reader, in which a card to be checked is received, for detecting the presence or absence of a perforation in each of the perforatable locations of the card by establishing or breaking pairs of electrical contacts individually associated with each of said locations, at least one posting system for at least one reference datum, an interrogation circuit for interrogating at least one validation datum entered on the card and for producing an output voltage responsive to said validation datum conforming to said reference datum, electromechanical means for retaining said card in said reader, and a utilization circuit responsive to the output of said interrogation circuit for controlling the release of the card by said electromechanical means, said utilization circuit comprising a first time delay relay which is supplied with direct current responsive to the introduction of a card in said reader for, in the inoperative state thereof, enabling energization of said interrogation circuit and said electromechanical means, a second time delay relay, having a time delay shorter than that of said first relay, for, in the operative state thereof, enabling energization of said interrogation circuit and said electromechanical means, and a third relay for inhibiting energization of said second relay responsive to said output voltage of said interrogation circuit, said device further comprising manually operated means for disconnecting said first and second relays, said interrogation circuit and said electromechanical means so as to cause release of a card from said reader.

2. An electromechanical device as claimed in claim 1 further comprising means responsive to the energization of said second relay for indicating nonconformity of said at least one validation datum with said at least one reference datum, and for, when actuated, commanding closure of an access, and means responsive to the energization of said third relay for indicating conformity of said at least one validation datum with said at least one reference datum and for, when actuated, commanding the opening of said access.

3. An electromechanical device as claimed in claim 1 wherein said posting system comprises a plurality of rotary contact switches for enabling posting the numbers of the year, the month, the day decade, and the day unit as well as numbers in excess of said numbers corresponding to dates which would be encompassed by said numbers, and a plurality of manual switches for enabling posting of the place or places where the card may be validly used.

4. An electromechanical device as claimed in claim 1 wherein said interrogation circuit comprises a plurality of relays which are grouped in a plurality of groups of successive relays each associated an elementary validation datum so as to completely define the limit date of the card, the excitation circuits of each of said relays being individually connected to a said pair of electrical contacts of said reader associated with a perforatable location on the card, the armature of one relay of each group being associated with a perforatable location on the card reserved in each column for the elementary validation datum of the lowest number, means for interrupting a direct current supply to said armatures, the inoperative contact of each of the successive relays of the same group of relays being connected to the armature of the following relay so that the successive relays, in inoperative states thereof, are supplied with direct current in series from the said one relay of that group, the operative contact of said relays being connected to the posting system for the corresponding reference data.

5. An electromechanical device as claimed in claim 1 wherein said interrogation circuit comprises a group of n relays equal in number to the number of perforatable locations on the card, which are reserved for the entry of coding data defining the place of validity of the card, each said relay controlling a number of two-state switches equal to the number of places of validity of the card, the armatures of said switches of the first group of said relays being connected to the output of said interrogation circuit and the excitation circuit of each of said relays being connected to one of the pairs of contacts of said reader associated with perforatable locations on the card reserved for place of validity coding data, said posting system including a set of manual two-position switches equal in number to the total number of the two-state switches of said relays, each of said manual switches being associated with a said two-state switch and having an armature which connects one of the contacts of the associated two-state switch to the armature of the next two-state switch in the same group of two-state switches so as to provide series connection of the two-state switches of the same group along a number of independent rows equal to the number of two-state switches of that relay, the armatures of the manual switches associated with the two-state switches of the final group of relays being connected in parallel with the output of said interrogation circuit.

6. An electromechanical device as claimed in claim 1 wherein said posting system comprises at least seven rotary contact switches, four of said rotary switches respectively enabling posting of the numbers of the year, month, the day decade and the day unit and the three further rotary switches being paired with three of said four rotary switches and enabling posting of numbers in excess of said numbers corresponding to years, months and day decades which would be encompassed by said numbers, the remaining one of said four rotary switches including means for enabling the posting of date units in excess of the day unit provided by that switch, whereby said seven switches enable recognition of a card as valid which has a limit date is equal to or later than that posted by said four switches, said posting system further comprising at least one further two-position switch for enabling posting of morning or afternoon use of the card whereby cards are recognized as valid which indicate that the validity is limited to half days of the posted day, the successive terminal studs of said four rotary switches and the successive terminal studs of the three rotary switches paired with the said three rotary switches of said four rotary switches being connected to the operating contacts of successive relays of one of said groups of relays, the terminal studs of said further two-position switch being connected to a further interrogation circuit, the rotary contact of the rotary switch for posting the year being connected to the contacts of the reader associated with validation of the month date on the card, the rotary contact of the rotary switch for posting the month being connected to the contacts of the reader associated with validation of the day decade on the card, the rotary contact of the rotary switch for posting the day decades being connected to the contacts of the reader associated with validation of the day unit on the card, and the rotary contact for posting the day unit being connected to the rotary contacts of the said three rotary switches and to contacts of the reader associated with validation of place of use of the card, the contact arm of said further two-position switch being connected to the output of said further interrogation circuit.

7. An electromechanical device as claimed in claim 6 wherein said excess number posting enabling means comprises means for enabling rotation of the rotary contacts of said three switches ahead one position relative to the rotary of contacts of the switches with which said three switches are paired, the rotary contacts for the excess months and the excess day decades, and the rotary contact for posting the day unit each including a conductive plate carried by the rotary contact for short circuiting the stationary contact studs preceding the rotary contact in the direction of rotation of the rotary contact.

8. An electromechanical device as claimed in claim 6 further comprising a totalizing system for totalizing changes of date and half day posting, said totalizing system comprising five rotary contact switches individually connected to the rotary switches for posting the year, month, day decade and day unit, and the switch for posting half days, the rotary contact of each of said five switches being rotated backward by one-half step with respect to the rotary contact of the corresponding date posting switch, said totalizing system further comprising a bistable relay including first and second two-state switches and first and second coils, said first coil being connected to the stationary contact studs of each of said five rotary switches and the armature of the first two-state switch being connected to a direct current supply, a manual control switch being provided for controlling energization of said second coil, said totalizer system further comprising a counter including an excitation circuit for counting unit increments responsive to the making and breaking of a connection between said excitation circuit and that one of the two contacts of the first two-state switch of said bistable relay which is engaged by the armature thereof when said first coil is energized, the armature of the second two-state switch of said bistable relay being connected to a relay for completing a connection to a supply circuit, and the one contact of said second two-state switch which is engaged by the armature of that switch when said second coil is energized being connected to a circuit breaking switch which is closed responsive to the introduction of a card into said reader and which is connected to the said one contact of said second two-state switch.

9. An electromechanical device as claimed in claim 8 wherein said totalizing system further comprises auxiliary means for enabling energization of said totalizing system when the supply to the said system is disconnected, said auxiliary means comprising a further relay including first and second two-state switches which are connected to a direct current supply through said circuit breaking switch when the armature of said first two-state switch is connected to the operative contact of that switch, the inoperative contact of said first two-state switch being connected through the operative contact of said second two-state switch to the rotary contacts of said five rotary contact switches, the armature of said second two-state switch being connected to a supply for said further relay, to the armature of said first two-state switch of said first relay to said circuit breaking switch and to said manual control switch, said auxiliary means further comprising a storage battery the positive terminal of which is connected to the armature of said first two-state switch of said further relay and the negative terminal of which is connected to ground.

10. An electromechanical device as claimed in claim 1, further comprising an accounting circuit comprising a plurality of pulse counters for providing separate totalizing of the different data carried by different cards corresponding to said card upon introduction of the cards into said reader, the said data being entered on each of said cards in the form of two perforations, the first of said two perforations being made in one of the perforatable locations of first category and the second of said two perforations being made in one of the perforatable locations of a second category, said counters being arranged in a number of discrete series equal to the number of perforatable locations of said first category, each of said series being connected in parallel to a pair of contacts of the reader associated with the perforatable locations of the first category, the number of counters being equal to the number of perforatable locations of said second category, the counters being arranged in rows and the output of the same row of the different series being connected in parallel with the output of a pair of contacts of the reader associated with the perforatable locations of the second category.

11. An electromechanical device as claimed in claim 10 further comprising at least seven rotary contact switches, four of said rotary switches respectively enabling posting of the numbers of the year, month, the day decade and the day unit and the three further rotary switches being paired with three of said four rotary switches and enabling posting of numbers in excess of said numbers corresponding to years, months and day decades which would be encompassed by said numbers, the remaining one of said four rotary switches including means for enabling the posting of date units in excess of the day unit provided by that switch, whereby said seven switches enable recognition of a card as valid which has a limit date is equal to or later than that posted by said four switches, said posting system further comprising at least one further two-position switch for enabling posting of morning or afternoon use of the card whereby cards are recognized as valid which indicate that the validity is limited to half days of the posted day, the successive terminal studs of said four rotary switches and the successive terminal studs of the three rotary switches paired with the said three rotary switches of said four rotary switches being connected to the operating contacts of successive relays of one of said groups of relays, the terminal studs of said further two-position switch being connected to a further interrogation circuit, the rotary contact of the rotary switch for posting the year being connected to the contacts of the reader associated with validation of the month date on the card, the rotary contact of the rotary switch for posting the month being connected to the contacts of the reader associated with validation of the day decade on the card, the rotary contact of the rotary switch for posting the day decades being connected to the contacts of the reader associated with validation of the day unit on the card, and the rotary contact for posting the day unit being connected to the rotary contacts of the said three rotary switches and to contacts of the reader associated with validation of place of use of the card, the contact arm of said further two-position switch being connected to the output of said further interrogation circuit, the cards further providing at least two documentary data for validating half day use, said further interrogation circuit comprising individual interrogation circuits each connected to one of two contact studs of said two-position switch for posting the half day and to one of the pulse counters for providing an accounting of validation of morning or afternoon use, said individual interrogation circuits each comprising a relay including first and second two-state switches and an excitation circuit connected between the outputs of the pair of contacts of the reader associated with the two perforatable locations on the card which provide the documentary data for validating half day use, the operating contact of each of the first two-state switches of said interrogation circuit relays being connected to the said stationary contact stud of said two-position switch, the inoperative contact of said switches being at least indirectly connected to the output of the said interrogation circuit, and the armature of said switches being connected at least indirectly to the output of the system for posting the coded data, the operative contacts of the second two-state switches of said interrogation circuit relays being connected to the input of said pulse counter and the armatures of said switches being at least indirectly connected to the output of said interrogation circuit, the inoperative contact of the first two-state switch of the relay of the interrogation circuit for morning validation data being connected to the armature of the first two-state switch of the relay of the interrogation circuit for afternoon validation data, and the armature of the first two-state switch of the relay for morning validity being connected in front of the armature of the first two-state switch of the relay of the interrogation circuit for afternoon validity, in the connection provided by the armatures of first two-state switches for the inoperative position of the relays connected between the output of the posting circuit for coded data and the output of the interrogation circuit.

12. An electromechanical device as claimed in claim 11 wherein at least two types of payments for the half day are provided, the first wherein the morning or afternoon validity is limited to the sole place of use of the device and the second corresponding to a group of specific places of which one is the place of use, said device comprising at least two said two-position switches for half day posting each associated with two of said individual interrogation circuits for one of the documentary data and corresponding validation, the armature of the first two-state switch of the relay of the interrogation circuit for documentary datum and morning validation of payments for said group of places being connected to the inoperative contact of the first two-state switch of the relay of the interrogation circuit for afternoon documentary datum and validation corresponding to payments paid only to the place of use in order to prevent a fraudulent extension of the half day payments that are made for a particular place of use to other places of use of said group, whereby such a fraudulent extension involving actuation of one of the first two-state switches of the relays of the circuits for validation of payments for place of use causes interruption of the connection between the output of the circuit for posting coded data and the output of the interrogation circuit by simultaneously actuation of one of the first two-state switches of the relays of the circuits for validation of payments made for the group thereby preventing acceptance of the card.

13. An electromechanical device as claimed in claim 10 further comprising at least one means for, in the absence of a card, enabling simultaneous actuation of said means for indicating conformity and a one unit incrementing of said pulse counters.

\* \* \* \* \*